(12) United States Patent
Namiki et al.

(10) Patent No.: US 12,024,057 B2
(45) Date of Patent: Jul. 2, 2024

(54) STATE ESTIMATION SYSTEM, RELAY DEVICE, STATE ESTIMATION METHOD, LEARNED MODEL GENERATION METHOD, AND RECORDING MEDIUM

(71) Applicant: HONDA MOTOR CO., LTD., Tokyo (JP)

(72) Inventors: Shigeru Namiki, Wako (JP); Minoru Uoshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 463 days.

(21) Appl. No.: 17/506,341

(22) Filed: Oct. 20, 2021

(65) Prior Publication Data

US 2022/0134904 A1 May 5, 2022

(30) Foreign Application Priority Data

Oct. 30, 2020 (JP) ................. 2020-183024

(51) Int. Cl.
*B60L 58/13* (2019.01)
*B60W 50/00* (2006.01)
*G06N 20/00* (2019.01)

(52) U.S. Cl.
CPC ............ *B60L 58/13* (2019.02); *B60W 50/00* (2013.01); *G06N 20/00* (2019.01); *B60W 2050/0016* (2013.01)

(58) Field of Classification Search
CPC ........ B60L 58/13; G06N 20/00; B60W 50/00; B60W 2050/0016
USPC .......................................... 320/104
See application file for complete search history.

(56) References Cited

U.S. PATENT DOCUMENTS

| 2020/0292620 A1* | 9/2020 | Takahashi .......... G01R 31/3648 |
| 2021/0101502 A1* | 4/2021 | Choi .................... B60L 53/68 |
| 2022/0024438 A1* | 1/2022 | Vuylsteke ............ B60W 10/06 |

FOREIGN PATENT DOCUMENTS

JP 2014-206499 10/2014

* cited by examiner

*Primary Examiner* — Nathaniel R Pelton
(74) *Attorney, Agent, or Firm* — Rankin, Hill & Clark LLP

(57) ABSTRACT

A state estimation system includes a first processor, and the first processor executes: a first state variable measurement process of measuring a first state variable of a monitored object; a second state variable estimation repetition process of repeating a second state variable estimation process of inputting a measurement value of the first state variable into a learned model and acquiring an estimate value of a second state variable outputted from the learned model; and an estimation accuracy decline information output process of outputting estimation accuracy decline information when a predetermined estimate value sudden change determination condition is met with respect to a first estimate value of the second state variable acquired in response to input of a first measurement value of the first state variable.

13 Claims, 4 Drawing Sheets

STATE ESTIMATION SYSTEM, RELAY DEVICE, STATE ESTIMATION METHOD, LEARNED MODEL GENERATION METHOD, AND RECORDING MEDIUM

INCORPORATION BY REFERENCE

The present application claims priority under 35 U.S.C. § 119 to Japanese Patent Application No. 2020-183024 filed on Oct. 30, 2020. The content of the application is incorporated herein by reference in its entirety.

BACKGROUND OF THE INVENTION

Field of the Invention

The present invention relates to a state estimation system, a relay device, a state estimation method, a learned model generation method, and a recording medium.

Description of the Related Art

Conventionally, a secondary battery life prediction system has been proposed that predicts a life of a secondary battery by using a neural network (for example, see Japanese Patent Laid-Open No. 2014-206499). In the system, a secondary battery for evaluation is repeatedly charged and discharged, and a characteristic database is generated in which measurement values of a characteristic of the secondary battery for evaluation are associated with actual values of the maximum duration of discharge. Then, by using the characteristic database as teaching data, a learned model is generated that receives a measurement value of the predetermined characteristic as input and outputs an estimate value of the maximum duration of discharge.

Inventors of the present application have found that, when a state of an object, such as a secondary battery, is estimated by a learned model using a neural network as described above, accuracy of an estimate value of the state outputted from the learned model declines in some cases. Various inconveniences may occur if the object is controlled or the state of the object is announced based on such a less accurate estimate value.

The present invention has been made in view of such a background, and an object of the present invention is to provide a state estimation system, a relay device, a state estimation method, a learned model generation method, and a recording medium that can prevent processing based on a less accurate estimate value from being performed in consequence of the less accurate estimate value being outputted from a learned model.

SUMMARY OF THE INVENTION

A first aspect to achieve the above-described object is a state estimation system including a first processor that executes: a process of functioning as a learned model generated such as to receive a measurement value of a first state variable as input and to output an estimate value of a second state variable with respect to an object of a predetermined type, by performing machine learning using, for teaching data, sample data on the first state variable and the second state variable of the object; a first state variable measurement process of measuring the first state variable of a monitored object that is an object of the predetermined type; a second state variable estimation repetition process of repeating a second state variable estimation process at each predetermined estimation timing, the second state variable estimation process of inputting a measurement value of the first state variable measured through the first state variable measurement process into the learned model and acquiring output from the learned model as an estimate value of the second state variable of the monitored object; and an estimation accuracy decline information output process of outputting estimation accuracy decline information when a predetermined estimate value sudden change determination condition is met with respect to a first estimate value of the second state variable acquired through the second state variable estimation process in response to input of a first measurement value of the first state variable, or when the first measurement value is out of a supposed range of inputs according to the teaching data.

In the state estimation system, the estimation accuracy decline information may include the first measurement value, and the state estimation system may further include a second processor that executes an additional learning process of performing additional learning for the learned model, based on the first measurement value.

The state estimation system may include the first processors for a plurality of the monitored objects, respectively, the first processors executing the process of functioning as the learned model, the first state variable measurement process, the second state variable estimation repetition process, and the estimation accuracy decline information output process with respect to the monitored objects, respectively, wherein when the second processor performs additional learning through the additional learning process for any one of the learned models based on the first measurement value included in the estimation accuracy decline information outputted through the estimation accuracy decline information output process executed by any one of the first processors, the second processor may execute a process of causing a content of the additional learning to be reflected in the other learned models.

In the state estimation system, as the estimate value sudden change determination condition, a fact may be set that the first estimate value acquired through the second state variable estimation process in response to input of the first measurement value changes by a predetermined value or more from a second estimate value of the second state variable acquired through the second state variable estimation process in response to input of a second measurement value of the first state variable measured through the first state variable measurement process, the second estimate value acquired at the estimation timing immediately preceding to the estimation timing at which the first measurement value is inputted.

In the state estimation system, the monitored object may be mounted in a mobile object, and when the first processor outputs the estimation accuracy decline information through the estimation accuracy decline information output process, the first processor may execute an estimation accuracy decline handling process of prohibiting predetermined processing based on the first estimate value of the second state variable from being performed at the mobile object.

In the state estimation system, the predetermined processing may be display of a state of the monitored object, based on an estimate value of the second state variable, on a display included in the mobile object, and when the first processor prohibits, through the estimation accuracy decline handling process, display of a state of the monitored object on the display based on the first estimate value of the second state variable, the first processor may execute a process of displaying a state of the monitored object on the display, based on an estimate value of the second state variable acquired through the second state variable estimation process at the estimation timing immediately preceding to the estimation timing at which the first measurement value is inputted.

In the state estimation system, the predetermined processing may be display of a state of the monitored object, based on an estimate value of the second state variable, on a display included in the mobile object, and when the first processor prohibits, through the estimation accuracy decline handling process, display of a state of the monitored object on the display based on the first estimate value of the second state variable, the first processor may execute a process of displaying a state of the monitored object on the display, based on an upper limit or a lower limit of a preset predetermined range of the second state variable.

In the state estimation system, the object of the predetermined type may be a battery, the first state variable may include at least one of voltage, current, and temperature of the battery, and the second state variable may be SOC (State Of Charge) of the battery.

In the state estimation system, when the first processor outputs a specific information frame including the estimation accuracy decline information through the estimation accuracy decline information output process, the first processor may add, to the specific information frame, a priority level relative to other information frames treated in the state estimation system.

A second aspect to achieve the above-described object is a relay device that transmits the specific information frame outputted through the estimation accuracy decline information output process, wherein the relay device transmits the specific information frame, based on the priority level added to the specific information frame.

A third aspect to achieve the above-described object is a state estimation method executed by a first computer, including: by the first computer, functioning as a learned model generated such as to receive a measurement value of a first state variable as input and to output an estimate value of a second state variable with respect to an object of a predetermined type, by performing machine learning using, for teaching data, sample data on the first state variable and the second state variable of the object; measuring the first state variable of a monitored object that is an object of the predetermined type; repeating a second state variable estimation process at each predetermined estimation timing, the second state variable estimation process of inputting a measurement value of the first state variable into the learned model and acquiring output from the learned model as an estimate value of the second state variable of the monitored object; and outputting estimation accuracy decline information when a predetermined estimate value sudden change determination condition is met with respect to a first estimate value of the second state variable acquired through the second state variable estimation process in response to input of a first measurement value of the first state variable, or when the first measurement value is out of a supposed range of inputs according to the teaching data.

A fourth aspect to achieve the above-described object is a learned model generation method executed by a second computer for the learned model implemented on the first computer that executes the state estimation method, wherein the estimation accuracy decline information includes the first measurement value, the learned model generation method including: by the second computer, generating a new version of the learned model for the object of the predetermined type, by performing additional machine learning using, for teaching data, sample data on the first state variable and second state variable of the object; and performing additional learning for the learned model, based on the first measurement value.

A fifth aspect to achieve the above-described object is a non-transitory recording medium storing a state estimation program that causes a computer to execute: a process of functioning as a learned model generated such as to receive a measurement value of a first state variable as input and to output an estimate value of a second state variable with respect to an object of a predetermined type, by performing machine learning using, for teaching data, sample data on the first state variable and the second state variable of the object; a process of measuring the first state variable of a monitored object that is an object of the predetermined type; a process of repeating a second state variable estimation process at each predetermined estimation timing, the second state variable estimation process of inputting a measurement value of the first state variable into the learned model and acquiring output from the learned model as an estimate value of the second state variable of the monitored object; and a process of outputting estimation accuracy decline information when a predetermined estimate value sudden change determination condition is met with respect to a first estimate value of the second state variable acquired through the second state variable estimation process in response to input of a first measurement value of the first state variable, or when the first measurement value is out of a supposed range of inputs according to the teaching data.

According to the state estimation system as described above, estimation accuracy decline information is outputted when accuracy of an estimate value of the second state variable of the monitored object outputted from the learned model may decline due to a sudden change in the estimate value of the second state variable, or due to a measurement value of the first state variable being out of the supposed range of inputs. In response to output of the estimation accuracy decline information, the decline in accuracy of the estimate value is handled, whereby it is possible to prevent processing based on the less accurate estimate value from being performed in consequence of the less accurate estimate value being outputted from the learned model.

DETAILED DESCRIPTION OF THE PREFERRED EMBODIMENTS

[1. Configuration of State Estimation System]

Figure 1:
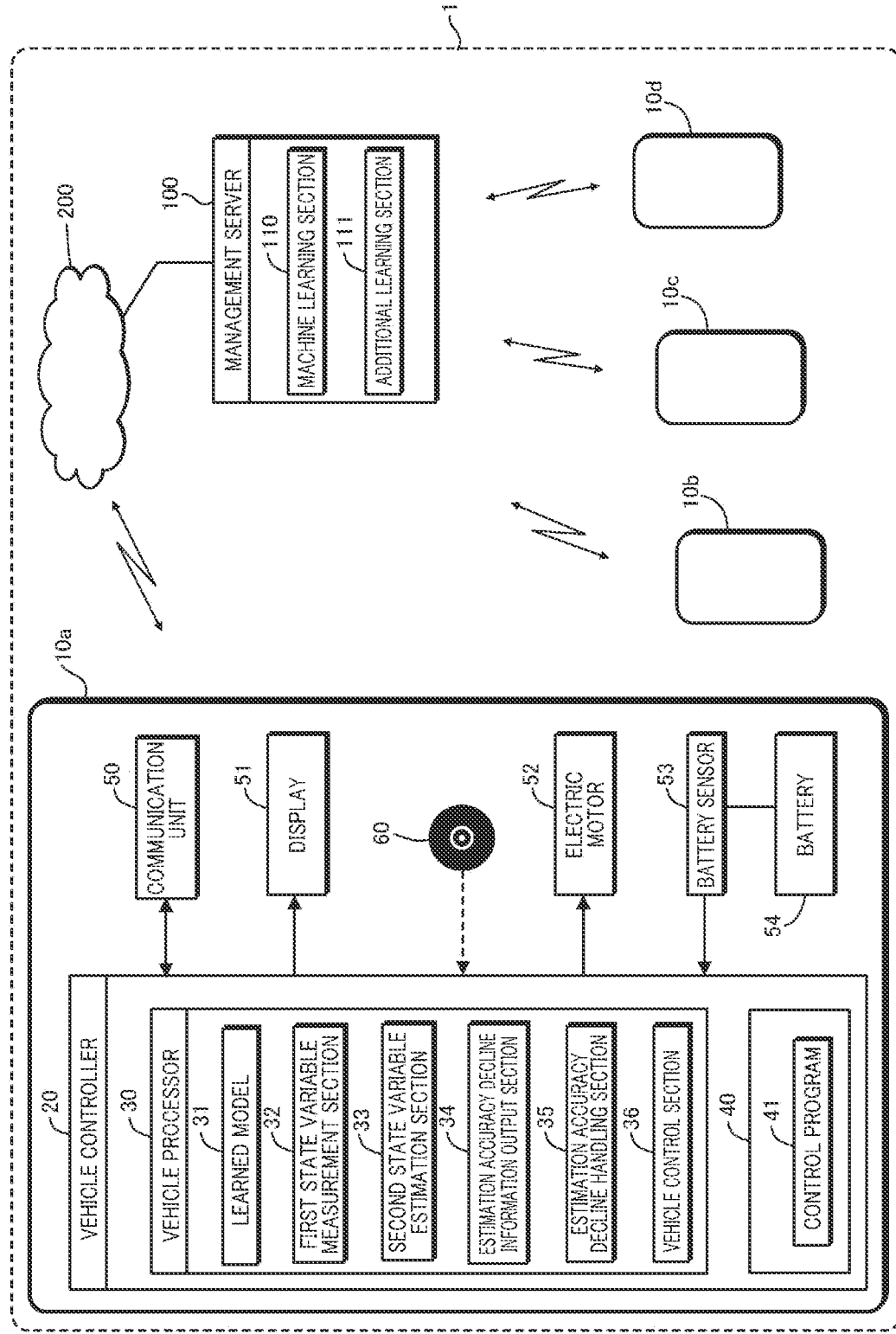
FIG. 1 is a configuration diagram of a state estimation system.

A configuration of a state estimation system 1 according to an embodiment will be described with reference to FIG. 1. The state estimation system 1 includes a plurality of vehicles 10*a* to 10*d* (more specifically, vehicle controllers 20 mounted in the vehicles 10*a* to 10*d*, respectively) and a management server 100. Each of the vehicles 10*a* to 10*d* and the management server 100 communicate with each other via a communication network 200. Note that the number of vehicles (each corresponding to a mobile object) included in the state estimation system 1 may be one, or two or more.

The management server 100 is a computer system including a processor, a memory, a communication device, and the like (not shown). The management server 100 includes a machine learning section 110 and an additional learning section 111 that are implemented by the processor executing a vehicle management program stored in the memory. The processor included in the management server 100 corresponds to a second processor and a second computer in the present invention.

Since the vehicles 10a to 10d are vehicles of the same type and individually have a similar configuration, the vehicle 10a will be described hereinafter. The vehicle 10a is an electric-powered vehicle (electric automobile, hybrid automobile, or the like) that includes a battery 54 and an electric motor 52 and that travels by causing the electric motor 52 to operate by using electricity supplied from the battery 54. The battery 54 corresponds to a monitored object.

The vehicle 10a includes a vehicle controller 20, a communication unit 50, a display 51, and a battery sensor 53. The communication unit 50 includes a processor for communication such as a modem (modulator-demodulator). The communication unit 50 corresponds to a relay device of the present invention, and relays communication between the vehicle controller 20 and the management server 100. The display 51 displays various information, according to a control signal from the vehicle controller 20. The battery sensor 53 detects a voltage, currents (input and output currents), a temperature, or the like of the battery 54, and outputs a detection signal to the vehicle controller 20.

The vehicle controller 20 performs communication based on CAN (Controller Area Network) protocol with the communication unit 50, the display 51, the electric motor 52, and the battery sensor 53.

A vehicle processor 30 includes one or more processors. The vehicle processor 30 functions as a learned model 31, a first state variable measurement section 32, a second state variable estimation section 33, an estimation accuracy decline information output section 34, an estimation accuracy decline handling section 35, and a vehicle control section 36, by reading and executing a control program 41 for the vehicle 10a stored in a memory 40. The vehicle processor 30 corresponds to a computer, a first processor, and a first computer in the present invention.

In the vehicle processor 30 on which the learned model 31 is implemented, a process executed by the first state variable measurement section 32 corresponds to a first state variable measurement process in a state estimation method of the present invention. Moreover, a process executed by the second state variable estimation section 33 corresponds to a second state variable estimation process in the state estimation method of the present invention, and a process executed by the estimation accuracy decline information output section 34 corresponds to an estimation accuracy decline information output process in the state estimation method of the present invention.

The control program 41 may be transmitted from the management server 100 to the vehicle 10a, and stored in the memory 40 by the vehicle controller 20. Alternatively, the control program 41 stored in a non-transitory recording medium 60 (magnetic disk, magnetic tape, optical disk, flash memory, or the like) may be read and stored in the memory 40 by the vehicle controller 20. The control program 41 includes a state estimation program in the present invention.

Figure 2:
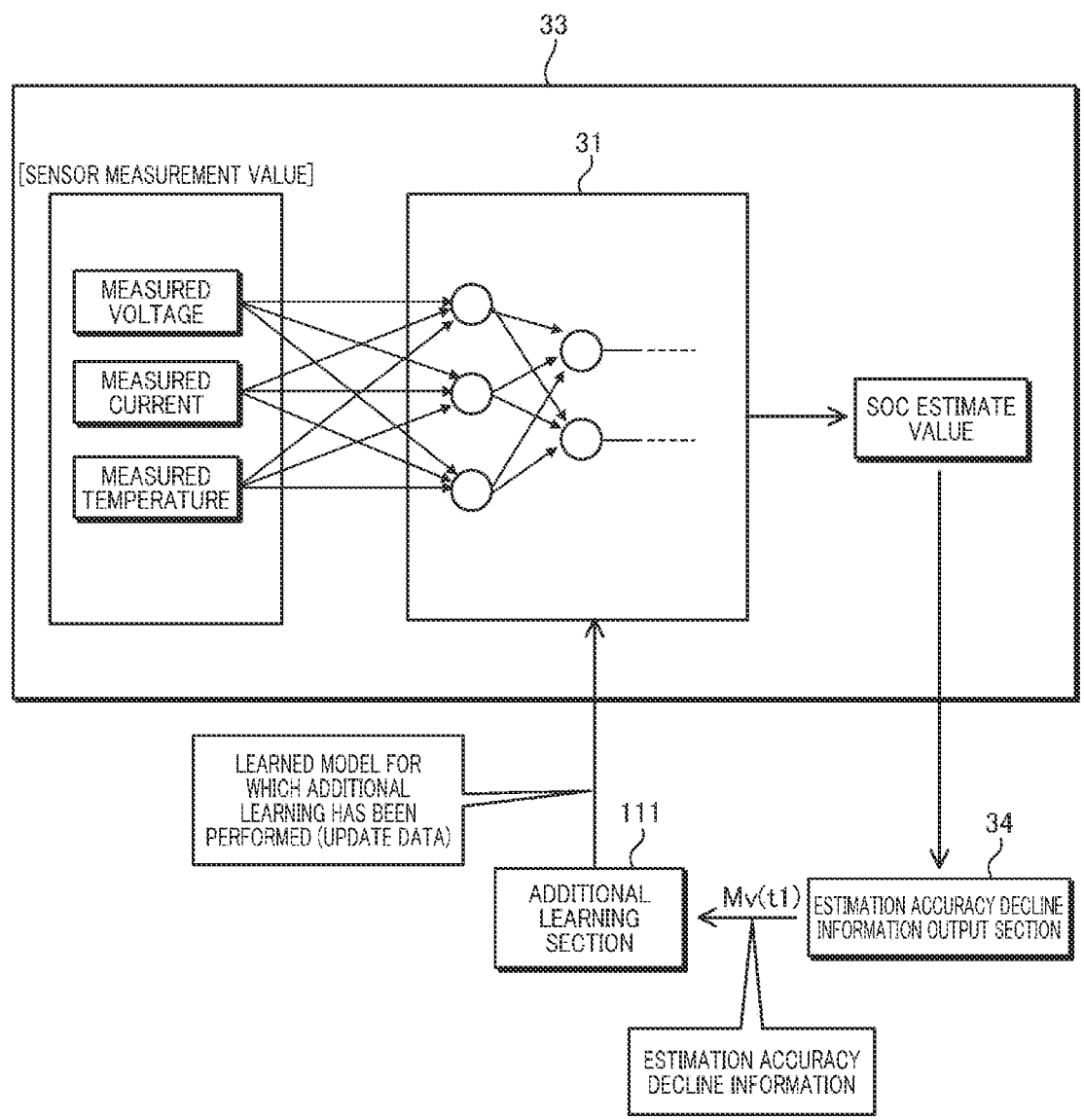
FIG. 2 is an explanatory diagram of additional learning for a learned model.

The learned model 31 is generated by the machine learning section 110 included in the management server 100. As shown in FIG. 2, the learned model 31 receives, as input, measurement values of voltage (voltage between terminals), current (input and output currents), and temperature of a battery whose state is to be estimated (corresponding to an object of a predetermined type in the present invention), and outputs an estimate value of SOC (States Of Charge) of the battery. Each of the voltage, the current, and the temperature of the battery corresponds to a first state variable in the present invention, and the SOC of the battery corresponds to a second state variable in the present invention.

Note that for the first state variable, not all but at least one of the voltage, the current, and the temperature of the battery may be used. For the first state variable, another state variable may be used in addition to voltage, current, and temperature, and only a state variable other than voltage, current, and temperature may be used. For the second state variable, a state variable other than SOC may be used.

The machine learning section 110 uses, for teaching data, a set of sample data that indicates relations between the first state variables and the second state variable of the battery, and that is obtained through an evaluation test or the like using an evaluation battery. The machine learning section 110 generates the learned model 31 by causing a machine learning model (classifier internally including relations between input data and output data) to perform machine learning by using the teaching data. For the machine learning model, a model such as a neural network or a support vector machine is used. The machine learning model may be configured by using, for example, RNN (recurrent neural network), and an intermediate layer of the RNN may be configured by using LSTM (long short-term memory) or GRU (gated recurrent unit).

The first state variable measurement section 32 obtains measurement values of the voltage, the current, and the temperature of the battery 54 (measurement values of the first state variables), based on detection signals of voltage, current, and temperature outputted from the battery sensor 53, each time a predetermined estimation interval elapses. A time point at which the estimation interval elapses corresponds to an estimation timing in the present invention.

The second state variable estimation section 33 performs the second state variable estimation process of inputting, into the learned model 31, the measurement values of the voltage, the current, and the temperature of the battery 54 obtained by the first state variable measurement section 32, and acquiring output from the learned model 31 as an estimate value of the SOC of the battery 54 (estimate value of the second state variable). The estimation accuracy decline information output section 34 calculates $\Delta SOC$ ($=SOC(t1)-SOC(t2)$) that is a difference between a first estimate value $SOC(t1)$, which is an estimate value of SOC estimated by the second state variable estimation section 33 with respect to input of first measurement values $Mv(t1)$ at a current estimation timing, and a second estimate value $SOC(t2)$, which is an estimate value of SOC estimated by the second state variable estimation section 33 with respect to input of second measurement values $Mv(t2)$ at a previous (immediately preceding) estimation timing.

When a magnitude of $\Delta SOC$ is equal to or more than a predetermined value, that is, when the estimate value of SOC changes from the previous estimation timing by the predetermined value or more, the estimation accuracy decline information output section 34 outputs estimation accuracy decline information to the estimation accuracy decline handling section 35 and the management server 100. The fact that the estimate value of SOC changes from the previous estimation timing by the predetermined value or more corresponds to an estimate value sudden change determination condition in the present invention. Note that for the estimate value sudden change determination condition, a condition other than the fact that the estimate value of SOC changes from the previous estimation timing by the predetermined value or more may be set, and it may be determined whether or not the condition is met. For example, the estimate value sudden change determination condition may be that a change rate of the first estimate value SOC(t1) to the second estimate value SOC(t2) is equal to or more than a predetermined change rate threshold value.

The estimation accuracy decline information output section 34 also outputs the estimation accuracy decline information to the estimation accuracy decline handling section 35 and the management server 100 when any of the first measurement values Mv(t1), which are measurement values of the first state variables obtained by the first state variable measurement section 32 at the current estimation timing, is out of a supposed range of inputs that is set according to a range of the first state variable in the above-mentioned teaching data. The supposed range of inputs is set, for example, slightly narrower than the range of each first state variable in the teaching data.

The estimation accuracy decline information output section 34 transmits a specific information frame including the estimation accuracy decline information to the communication unit 50, and the estimation accuracy decline information is transmitted from the communication unit 50 to the management server 100 via the communication network 200. The estimation accuracy decline information output section 34 adds, to the specific information frame including the estimation accuracy decline information, a priority level relative to other information frames transmitted and received based on the CAN protocol in the vehicle 10a. In the present embodiment, a highest priority level is assigned to the specific information frame including the estimation accuracy decline information.

The communication unit 50 transmits the specific information frame including the estimation accuracy decline information to the management server 100 prior to other information frames, according to the priority level set by the estimation accuracy decline information output section 34. The priority level added to the specific information frame including the estimation accuracy decline information is taken over and applied also at a relay device in a wireless base station used on the communication network 200, and at a relay device used in the management server 100.

In other words, information on the priority level assigned by the estimation accuracy decline information output section 34 is taken over even when a format of the specific information frame is changed to another format according to a communication protocol other than CAN. In each relay device, the specific information frame including the estimation accuracy decline information is preferentially transmitted prior to other information frames. Thus, a decline in estimation accuracy is swiftly transmitted to the management server 100, to make it possible to quickly handle the decline in estimation accuracy. Here, addition of the priority level to the information frame is performed by, for example, changing an ID number attached to a beginning of the information frame. In other words, for example, among IDs such as "0", "1", "2", and "100", a number closer to "0" is treated as a higher priority level.

Here, output of the estimation accuracy decline information to the estimation accuracy decline handling section 35 results in data processing in the vehicle processor 30, and output of the estimation accuracy decline information to the management server 100 results in transmission of the estimation accuracy decline information, by using the communication unit 50, to the management server via the communication network 200.

The estimation accuracy decline information transmitted to the management server 100 includes the first measurement values Mv(t1), which are the measurement values of voltage, current, and temperature inputted into the learned model 31 when the SOC(t1) is estimated. Here, when the SOC(t1), which is the estimate value of SOC acquired by the second state variable estimation section 33 at the current estimation timing, has changed from the estimate value SOC(t2) at the previous estimation timing by the predetermined value or more, accuracy in estimation of the estimate value of SOC outputted from the learned model 31 may decline due to such a factor as any of the first measurement values Mv(t1) inputted into the learned model 31 exceeding the range of inputs covered by the teaching data used in machine learning for the learned model 31.

Accordingly, at the management server 100 that has received the estimation accuracy decline information transmitted from the vehicle 10a, the additional learning section 111 performs additional learning for the learned model 31. As shown in FIG. 2, the additional learning section 111 performs additional learning for the learned model 31, by using the first measurement values Mv(t1) included in the estimation accuracy decline information transmitted from the estimation accuracy decline information output section 34.

Specifically, the additional learning section 111 extracts an SOC of the evaluation battery corresponding to the first measurement values Mv(t1) from evaluation test data, or calculates a simulation value of SOC of the evaluation battery corresponding to the first measurement values Mv(t1) through computer simulation, thereby acquiring the SOC corresponding to the first measurement values Mv(t1). Then, the additional learning section 111 performs additional learning for the learned model 31, by using teaching data in which the first measurement values Mv(t1) are associated with the acquired SOC.

Note that when it is confirmed that the first measurement values Mv(t1) obtained by the first state variable measurement section 32 are measured with high accuracy, additional learning may be performed by directly using the estimation accuracy decline information including the acquired first measurement values Mv(t1).

The additional learning section 111 transmits, to the vehicle 10a and the other vehicles 10b to 10d, update data for the learned model 31 for which the additional learning has been performed, and a process of updating the learned model 31 is executed at each of the vehicles 10a to 10d that have received the update data. As described above, when estimation accuracy decline information is received from any one of the vehicles 10a to 10d, the additional learning section 111 performs additional learning for the learned model 31, and transmits update data for the learned model 31 to each of the vehicles 10a to 10d. Thus, additional learning is performed by the learned model 31 of each of the vehicles 10a to 10d.

The process, by the additional learning section 111, of generating a new learned model by performing additional learning for the learned model 31 corresponds to a process according to a learned model generation method of the present invention. The process, by the additional learning section 111, of performing additional learning for the learned model 31 based on the first measurement values Mv(t1) corresponds to an additional learning process in the learned model generation method of the present invention.

The vehicle control section 36 controls traveling of the vehicle 10*a* by controlling operation of the electric motor 52. The vehicle control section 36 displays a state (a charge rate, a distance that can be traveled, or the like) of the battery 54 on the display 51, based on an estimate value of the SOC of the battery 54 acquired by the second state variable estimation section 33. The control of traveling of the vehicle 10*a* and the display of a state of the battery 54 on the display 51 correspond to predetermined processing in the present invention. When the estimation accuracy decline information is outputted from the estimation accuracy decline information output section 34, the estimation accuracy decline handling section 35 prohibits the vehicle control section 36 from performing control based on the first estimate value SOC(t1) of the battery 54 estimated at the current estimation timing.

For example, when the estimation accuracy decline information is outputted, the estimation accuracy decline handling section 35 prohibits control of the electric motor 52 based on the first estimate value SOC(t1) of the battery 54. Moreover, when the estimation accuracy decline information is outputted, the estimation accuracy decline handling section 35 prohibits display of a state of the battery 54 on the display 51 based on the first estimate value SOC(t1) of the battery 54.

[2. Battery State Estimation Process]

A process of estimating a state of the battery 54 executed by the vehicle processor 30 will be described, following flowcharts shown in FIGS. 3 to 4. The vehicle processor 30 executes the process according to the flowchart of FIG. 3 each time the estimation interval elapses.

Figure 3:
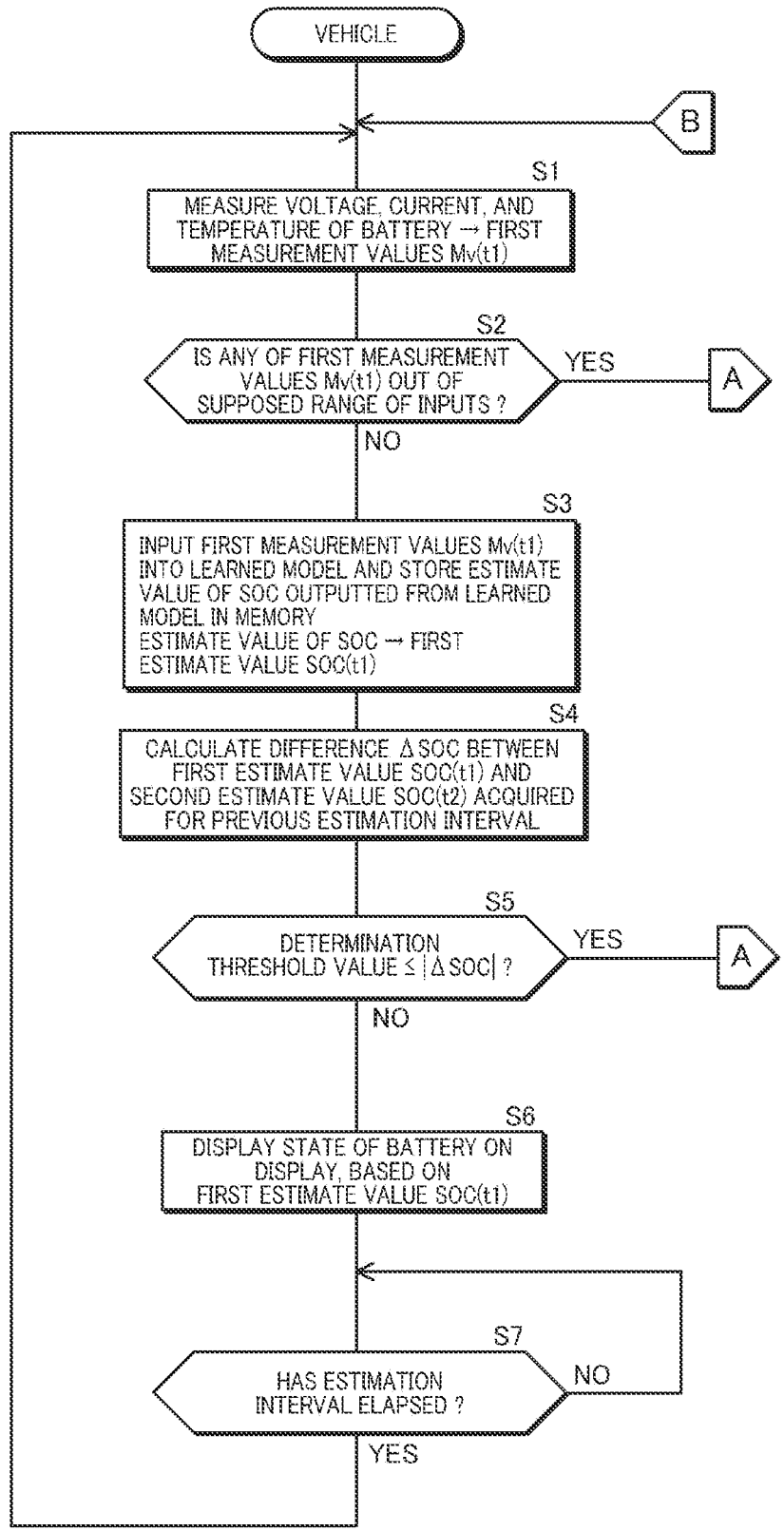
FIG. 3 is a first flowchart of a battery state estimation process.

In step S1 in FIG. 3, the first state variable measurement section 32 obtains first measurement values Mv(t1), which are measurement values of the voltage, the current, and the temperature of the battery 54 (measurement values of the first state variables) at the current estimation timing, based on detection signals from the battery sensor 53. In next step S2, the estimation accuracy decline information output section 34 determines whether or not the first measurement values Mv(t1) are out of the respective supposed ranges of inputs for the first state variables. The estimation accuracy decline information output section 34 advances the process to step S10 in FIG. 4 when any of the first measurement values Mv(t1) is out of the supposed range of inputs, and advances the process to step S3 when the first measurement values Mv(t1) are within the respective supposed ranges of inputs.

In step S3, the second state variable estimation section 33 inputs the first measurement values Mv(t1) into the learned model 31, acquires an estimate value of the SOC of the battery 54 outputted from the learned model 31, and stores the estimate value of SOC in the memory 40. The second state variable estimation section 33 sets the estimate value of SOC acquired in step S3 as a first estimate value SOC(t1) that is an estimate value for the current estimation interval.

In subsequent step S4, the estimation accuracy decline information output section 34 calculates $\Delta SOC(=SOC(t1)-SOC(t2))$, which is a difference between the first estimate value SOC(t1) and a second estimate value SOC(t2) that is an estimate value of SOC acquired for the previous estimation interval and stored in the memory 40.

In next step S5, the estimation accuracy decline information output section 34 determines whether or not the magnitude of $\Delta SOC$ is equal to or more than a determination threshold value. The estimation accuracy decline information output section 34 advances the process to step S10 in FIG. 4 when $\Delta SOC$ is equal to or more than the determination threshold value, and advances the process to step S6 when $\Delta SOC$ is smaller than the determination threshold value. In step S6, the vehicle control section 36 displays a state of the battery 54 on the display 51, based on the first estimate value SOC(t1). In subsequent step S7, the vehicle control section 36 advances the process to step S1 when the estimation interval has elapsed.

Figure 4:
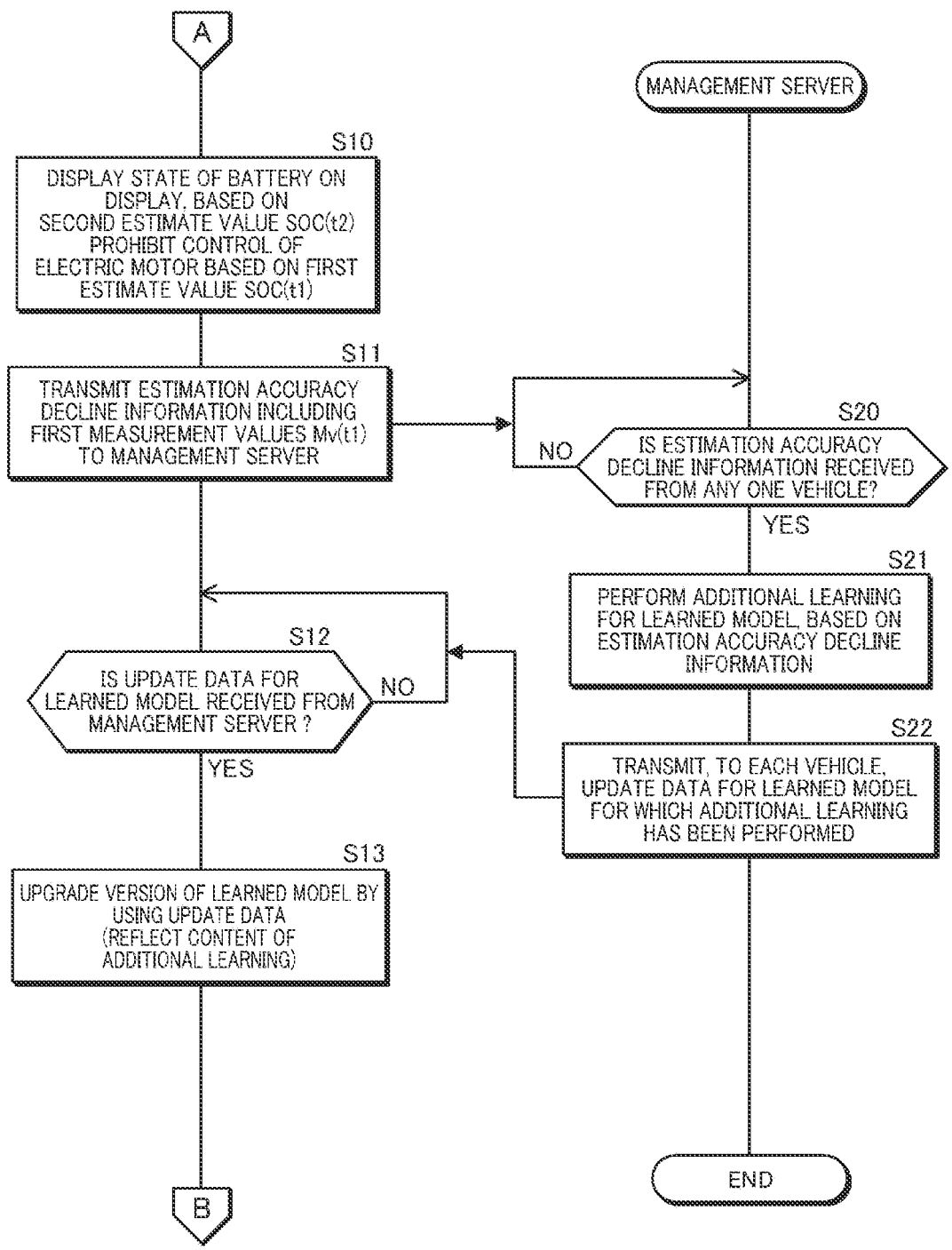
FIG. 4 is a second flowchart of the battery state estimation process.

Steps S10 to S13 in FIG. 4 are a handling process when any of the first measurement values Mv(t1) is out of the supposed range of inputs, or the magnitude of $\Delta SOC$ is equal to or more than the determination threshold value, and it is therefore thought that accuracy in estimation of the first estimate value SOC(t1) outputted from the learned model 31 is low.

In step S10, the estimation accuracy decline handling section 35 prohibits display of a state of the battery 54 on the display 51 based on the first estimate value SOC(t1), and causes display of a state of the battery 54 on the display 51 to be rendered based on the second estimate value SOC(t2). Moreover, the estimation accuracy decline handling section 35 prohibits control of the electric motor 52 based on the first estimate value SOC(t1). In subsequent step S11, the estimation accuracy decline information output section 34 outputs the estimation accuracy decline information to the estimation accuracy decline handling section 35 and transmits the estimation accuracy decline information to the management server 100.

At the management server 100, when the estimation accuracy decline information is received from any one of the vehicles 10*a* to 10*d* in step S20, the additional learning section 111 advances the process to step S21, and performs additional learning for the learned model 31 as described above. In subsequent step S22, the additional learning section 111 transmits update data for the learned model 31 for which the additional learning has been performed to each of the vehicles 10*a* to 10*d*.

At the vehicle 10*a*, when the update data for the learned model 31 is received from the management server 100 in step S12, the estimation accuracy decline handling section 35 advances the process to step S13. In step S13, the estimation accuracy decline handling section 35 upgrades a version of the learned model 31 by using the update data, whereby a content of the additional learning is reflected in the learned model 31, and the additional learning for the learned model 31 is completed. Through the additional learning, adjustment is made to the estimation process executed by the learned model 31 with respect to the measurement values that have resulted in a decline in accuracy of the estimate value of SOC outputted from the learned model 31. Accordingly, with respect to subsequent input of first measurement values Mv(t1) and measurement values around Mv(t1) into the learned model 31, it is possible to prevent a decline in accuracy of the estimate value of SOC outputted from the learned model 31.

At the other vehicles 10*b* to 10*d*, the learned model 31 is also caused to perform additional learning by using the update data transmitted from the management server 100. As described above, the additional learning for the learned model 31 to handle a decline in accuracy of the estimate value of SOC that has occurred in any one vehicle is reflected also in other vehicles. Accordingly, a decline in accuracy of the estimate value of SOC at each of the vehicles 10*a* to 10*d* can be prevented quickly and efficiently through knowledge sharing.

[3. Other Embodiments]

In the above-described embodiment, the state estimation system 1 including the vehicles 10*a* to 10*d* and the management server 100 has been described. However, a configuration may be made such that the additional learning section 111 included in the management server 100 is incorporated in the control program 41 for the vehicle 10*a* and the vehicle processor 30 functions as the additional learning section 111. In such a case, the state estimation system is configured only with the vehicle 10*a*. Moreover, in such a case, the vehicle processor 30 corresponds to the first processor, the second processor, the first computer, and the second computer in the present invention. The same applies to the other vehicles 10*b* to 10*d*.

Any one or some, or all, of the learned model 31, the first state variable measurement section 32, the second state variable estimation section 33, the estimation accuracy decline information output section 34, and the estimation accuracy decline handling section 35 may be included in the management server 100. In such a case, control based on an estimate value of the SOC of the battery 54 at the vehicles 10*a* to 10*d* is performed based on control information transmitted from the management server 100 to the vehicles 10*a* to 10*d*.

In the above-described embodiment, the estimation accuracy decline handling section 35 executes, as a process of handling a decline in accuracy of an estimate value of the SOC of the battery 54 outputted from the learned model 31, both the process of prohibiting display of a state of the battery 54 on the display 51 based on the estimate value of SOC and the process of prohibiting control of the electric motor 52 based on the estimate value of SOC. However, the estimation accuracy decline handling section 35 may be configured to execute any one of the processes. Alternatively, the estimation accuracy decline handling section 35 may be configured to execute a handling process other than the processes.

In the above-described embodiment, the vehicles 10*a* to 10*d* are illustrated as mobile objects. However, a mobile object to which the present invention can be applied is not limited to a vehicle, and the present invention can be applied to mobile objects such as an air vehicle and a ship. Moreover, although the battery 54 is illustrated as an object whose state is estimated by using the learned model 31, the learned model 31 may be a learned model that estimates a state of the electric motor 52, an internal combustion engine, a generator, or the like.

Further, the present invention can also be applied in cases of estimating a state of a battery or a generator included not in a mobile object but in a fixed facility, or a state of an object included in a portable device, such as a battery included in a communication terminal or a mobile battery.

In the above-described embodiment, in step S10 in FIG. 4, the estimation accuracy decline handling section 35 causes display of a state of the battery 54 on the display 51 to be rendered based on the second estimate value SOC(t2) for the previous estimation interval. As another embodiment, the estimation accuracy decline handling section 35 may cause display of a state of the battery 54 on the display 51 to be rendered based on an upper limit or a lower limit of a preset predetermined range of estimate values of SOC.

Note that FIG. 1 is a schematic diagram in which the components of the state estimation system 1 are segmented and illustrated based on major contents of processing, to facilitate the understanding of the invention of the present application, and components of the state estimation system 1 may be configured and segmented based on other classification. Moreover, the process by each component may be executed by a single hardware unit, or may be executed by a plurality of hardware units. The process by each component shown in FIGS. 3 to 4 may be executed according to a single program, or may be executed according to a plurality of programs.

[4. Configurations Supported by the Embodiments]

The above-described embodiments represent specific examples of the following configurations.

(First item) A state estimation system including a first processor that executes: a process of functioning as a learned model generated such as to receive a measurement value of a first state variable as input and to output an estimate value of a second state variable with respect to an object of a predetermined type, by performing machine learning using, for teaching data, sample data on the first state variable and the second state variable of the object; a first state variable measurement process of measuring the first state variable of a monitored object that is an object of the predetermined type; a second state variable estimation repetition process of repeating a second state variable estimation process at each predetermined estimation timing, the second state variable estimation process of inputting a measurement value of the first state variable measured through the first state variable measurement process into the learned model and acquiring output from the learned model as an estimate value of the second state variable of the monitored object; and an estimation accuracy decline information output process of outputting estimation accuracy decline information when a predetermined estimate value sudden change determination condition is met with respect to a first estimate value of the second state variable acquired through the second state variable estimation process in response to input of a first measurement value of the first state variable, or when the first measurement value is out of a supposed range of inputs according to the teaching data.

According to the state estimation system of the first item, the estimation accuracy decline information is outputted when accuracy of an estimate value of the second state variable of the monitored object outputted from the learned model may decline due to a sudden change in the estimate value of the second state variable, or due to a measurement value of the first state variable being out of the supposed range of inputs. In response to output of the estimation accuracy decline information, the decline in accuracy of the estimate value is handled, whereby it is possible to prevent processing based on the less accurate estimate value from being performed in consequence of the less accurate estimate value being outputted from the learned model.

(Second item) The state estimation system according to the first item, wherein the estimation accuracy decline information includes the first measurement value, the state estimation system further including a second processor that executes an additional learning process of performing additional learning for the learned model, based on the first measurement value.

According to the state estimation system of the second item, additional learning for the learned model is performed with respect to a measurement value of the first state variable that may result in a decline in accuracy in estimation of the second state variable, whereby it is possible to prevent a decline in accuracy in estimation of the second state variable outputted from the learned model.

(Third item) The state estimation system according to the second item, including the first processors for a plurality of the monitored objects, respectively, the first processors executing the process of functioning as the learned model, the first state variable measurement process, the second state variable estimation repetition process, and the estimation accuracy decline information output process with respect to the monitored objects, respectively, wherein when the second processor performs additional learning through the additional learning process for any one of the learned models based on the first measurement value included in the estimation accuracy decline information outputted through the estimation accuracy decline information output process executed by any one of the first processors, the second processor executes a process of causing a content of the additional learning to be reflected in the other learned models.

According to the state estimation system of the third item, a content of additional learning for the learned model performed with respect to any one of the plurality of monitored objects is reflected in the other monitored objects, whereby it is possible to quickly and efficiently prevent a decline in accuracy in estimation of the second state variable, for each monitored object.

(Fourth item) The state estimation system according to any one of the first to third items, wherein as the estimate value sudden change determination condition, a fact is set that the first estimate value acquired through the second state variable estimation process in response to input of the first measurement value changes by a predetermined value or more from a second estimate value of the second state variable acquired through the second state variable estimation process in response to input of a second measurement value of the first state variable measured through the first state variable measurement process, the second estimate value acquired at the estimation timing immediately preceding to the estimation timing at which the first measurement value is inputted.

According to the state estimation system of the fourth item, when a sudden change occurs in an estimate value of the second state variable outputted from the learned model, it is determined that accuracy of the estimate value declines, and the estimation accuracy decline information can be outputted.

(Fifth item) The state estimation system according to any one of the first to fourth items, wherein the monitored object is mounted in a mobile object, and when the first processor outputs the estimation accuracy decline information through the estimation accuracy decline information output process, the first processor executes an estimation accuracy decline handling process of prohibiting predetermined processing based on the first estimate value of the second state variable from being performed at the mobile object.

According to the state estimation system of the fifth item, it is possible to prevent a situation where the predetermined processing is performed at the mobile object based on the first estimate value of the second state variable that may have become less accurate.

(Sixth item) The state estimation system according to the fifth item, wherein the predetermined processing is display of a state of the monitored object, based on an estimate value of the second state variable, on a display included in the mobile object, and when the first processor prohibits, through the estimation accuracy decline handling process, display of a state of the monitored object on the display based on the first estimate value of the second state variable, the first processor executes a process of displaying a state of the monitored object on the display, based on an estimate value of the second state variable acquired through the second state variable estimation process at the estimation timing immediately preceding to the estimation timing at which the first measurement value is inputted.

According to the state estimation system of the sixth item, in place of inappropriate display of a state of the monitored object based on the first estimate value of the second state variable that may have become less accurate, appropriate display based on the second estimate value acquired immediately preceding to the first estimate value can be performed.

(Seventh item) The state estimation system according to the fifth item, wherein the predetermined processing is display of a state of the monitored object, based on an estimate value of the second state variable, on a display included in the mobile object, and when the first processor prohibits, through the estimation accuracy decline handling process, display of a state of the monitored object on the display based on the first estimate value of the second state variable, the first processor executes a process of displaying a state of the monitored object on the display, based on an upper limit or a lower limit of a preset predetermined range of the second state variable.

According to the state estimation system of the seventh item, in place of inappropriate display of a state of the monitored object based on the first estimate value of the second state variable that may have become less accurate, appropriate display based on the upper limit or the lower limit of the predetermined range of the second state variable can be performed.

(Eighth item) The state estimation system according to any one of the first to seventh items, wherein the object of the predetermined type is a battery, the first state variable includes at least one of voltage, current, and temperature of the battery, and the second state variable is SOC (State Of Charge) of the battery.

According to the state estimation system of the eighth item, when accuracy of an estimate value of the SOC of the battery outputted from the learned model may have declined, it is possible to prevent processing based on the less accurate estimate value of SOC from being processed, by outputting estimation accuracy decline information.

(Ninth item) The state estimation system according to the first item, wherein when the first processor outputs a specific information frame including the estimation accuracy decline information through the estimation accuracy decline information output process, the first processor adds, to the specific information frame, a priority level relative to other information frames treated in the state estimation system.

According to the state estimation system of the ninth item, addition of the priority level to the estimation accuracy decline information by the estimation accuracy decline information output section enables the specific information frame including the estimation accuracy decline information to be treated preferentially over other information frames, whereby swift processing can be performed in response to the decline in estimation accuracy.

(Tenth item) A relay device that transmits the specific information frame outputted through the estimation accuracy decline information output process in the state estimation system according to the ninth item, wherein the relay device transmits the specific information frame, based on the priority level added to the specific information frame.

According to the relay device of the tenth item, when estimation accuracy decline information is outputted by the estimation accuracy decline information output section, the specific information frame including the estimation accuracy decline information is relayed prior to other information frames, based on the priority level added to the estimation accuracy decline information, whereby swift processing can be performed in response to the decline in estimation accuracy.

(Eleventh item) A state estimation method executed by a first computer, including: by the first computer, functioning as a learned model generated such as to receive a measurement value of a first state variable as input and to output an estimate value of a second state variable with respect to an object of a predetermined type, by performing machine learning using, for teaching data, sample data on the first state variable and the second state variable of the object; measuring the first state variable of a monitored object that is an object of the predetermined type; repeating a second state variable estimation process at each predetermined estimation timing, the second state variable estimation process of inputting a measurement value of the first state variable into the learned model and acquiring output from the learned model as an estimate value of the second state variable of the monitored object; and outputting estimation accuracy decline information when a predetermined estimate value sudden change determination condition is met with respect to a first estimate value of the second state variable acquired through the second state variable estimation process in response to input of a first measurement value of the first state variable, or when the first measurement value is out of a supposed range of inputs according to the teaching data.

By causing a computer to execute the state estimation method of the eleventh item, operations and effects similar to the above-described state estimation system of the first item can be achieved.

(Twelfth item) A learned model generation method executed by a second computer for the learned model implemented on the first computer that executes the state estimation method according to the eleventh item, wherein the estimation accuracy decline information includes the first measurement value, the learned model generation method including: by the second computer, generating a new version of the learned model for the object of the predetermined type, by performing additional machine learning using, for teaching data, sample data on the first state variable and second state variable of the object; and performing additional learning for the learned model, based on the first measurement value.

According to the learned model generation method of the twelfth item, additional learning for the learned model is performed with respect to a measurement value of the first state variable that may result in a decline in accuracy in estimation of the second state variable, whereby it is possible to prevent a decline in accuracy in estimation of the second state variable outputted from the learned model.

(Thirteenth item) A non-transitory recording medium storing a state estimation program that causes a computer to execute: a process of functioning as a learned model generated such as to receive a measurement value of a first state variable as input and to output an estimate value of a second state variable with respect to an object of a predetermined type, by performing machine learning using, for teaching data, sample data on the first state variable and the second state variable of the object; a process of measuring the first state variable of a monitored object that is an object of the predetermined type; a process of repeating a second state variable estimation process at each predetermined estimation timing, the second state variable estimation process of inputting a measurement value of the first state variable into the learned model and acquiring output from the learned model as an estimate value of the second state variable of the monitored object; and a process of outputting estimation accuracy decline information when a predetermined estimate value sudden change determination condition is met with respect to a first estimate value of the second state variable acquired through the second state variable estimation process in response to input of a first measurement value of the first state variable, or when the first measurement value is out of a supposed range of inputs according to the teaching data.

By causing a computer to execute the state estimation program of the thirteenth item, the configuration of the state estimation system of the first item described above can be implemented.

REFERENCE SIGNS LIST

1 . . . State estimation system, 10a to 10d . . . Vehicle, 20 . . . Vehicle controller, 30 . . . Vehicle processor, 31 . . . Learned model, 32 . . . First state variable measurement section, 33 . . . Second state variable estimation section, 34 . . . Estimation accuracy decline information output section, 35 . . . Estimation accuracy decline handling section, 40 . . . Memory, 41 . . . Control program, 50 . . . Communication unit (relay device), 51 . . . Display section, 52 . . . Electric motor, 53 . . . Battery sensor, 54 . . . Battery, 100 . . . Management server, 110 . . . Machine learning section, 111 . . . Additional learning section, 200 . . . Communication network.

What is claimed is:

1. A state estimation system comprising a first processor that executes:
   a process of functioning as a learned model generated such as to receive a measurement value of a first state variable as input and to output an estimate value of a second state variable with respect to an object of a predetermined type, by performing machine learning using, for teaching data, sample data on the first state variable and the second state variable of the object;
   a first state variable measurement process of measuring the first state variable of a monitored object that is an object of the predetermined type;
   a second state variable estimation repetition process of repeating a second state variable estimation process at each predetermined estimation timing, the second state variable estimation process of inputting a measurement value of the first state variable measured through the first state variable measurement process into the learned model and acquiring output from the learned model as an estimate value of the second state variable of the monitored object; and
   an estimation accuracy decline information output process of outputting estimation accuracy decline information when a predetermined estimate value sudden change determination condition is met with respect to a first estimate value of the second state variable acquired through the second state variable estimation process in response to input of a first measurement value of the first state variable, or when the first measurement value is out of a supposed range of inputs according to the teaching data.

2. The state estimation system according to claim 1, wherein the estimation accuracy decline information includes the first measurement value, the state estimation system further comprising a second processor that executes an additional learning process of performing additional learning for the learned model, based on the first measurement value.

3. The state estimation system according to claim 2, comprising the first processors for a plurality of the monitored objects, respectively, the first processors executing the process of functioning as the learned model, the first state variable measurement process, the second state variable estimation repetition process, and the estimation accuracy decline information output process with respect to the monitored objects, respectively,
  wherein when the second processor performs additional learning through the additional learning process for any one of the learned models based on the first measurement value included in the estimation accuracy decline information outputted through the estimation accuracy decline information output process executed by any one of the first processors, the second processor executes a process of causing a content of the additional learning to be reflected in the other learned models.

4. The state estimation system according to claim 1, wherein as the estimate value sudden change determination condition, a fact is set that the first estimate value acquired through the second state variable estimation process in response to input of the first measurement value changes by a predetermined value or more from a second estimate value of the second state variable acquired through the second state variable estimation process in response to input of a second measurement value of the first state variable measured through the first state variable measurement process, the second estimate value acquired at the estimation timing immediately preceding to the estimation timing at which the first measurement value is inputted.

5. The state estimation system according to claim 1, wherein
  the monitored object is mounted in a mobile object, and
  when the first processor outputs the estimation accuracy decline information through the estimation accuracy decline information output process, the first processor executes an estimation accuracy decline handling process of prohibiting predetermined processing based on the first estimate value of the second state variable from being performed at the mobile object.

6. The state estimation system according to claim 5, wherein
  the predetermined processing is display of a state of the monitored object, based on an estimate value of the second state variable, on a display included in the mobile object, and
  when the first processor prohibits, through the estimation accuracy decline handling process, display of a state of the monitored object on the display based on the first estimate value of the second state variable, the first processor executes a process of displaying a state of the monitored object on the display, based on an estimate value of the second state variable acquired through the second state variable estimation process at the estimation timing immediately preceding to the estimation timing at which the first measurement value is inputted.

7. The state estimation system according to claim 5, wherein
  the predetermined processing is display of a state of the monitored object, based on an estimate value of the second state variable, on a display included in the mobile object, and
  when the first processor prohibits, through the estimation accuracy decline handling process, display of a state of the monitored object on the display based on the first estimate value of the second state variable, the first processor executes a process of displaying a state of the monitored object on the display, based on an upper limit or a lower limit of a preset predetermined range of the second state variable.

8. The state estimation system according to claim 1, wherein
  the object of the predetermined type is a battery,
  the first state variable includes at least one of voltage, current, and temperature of the battery, and
  the second state variable is SOC (State Of Charge) of the battery.

9. The state estimation system according to claim 1, wherein when the first processor outputs a specific information frame including the estimation accuracy decline information through the estimation accuracy decline information output process, the first processor adds, to the specific information frame, a priority level relative to other information frames treated in the state estimation system.

10. A relay device that transmits the specific information frame outputted through the estimation accuracy decline information output process in the state estimation system according to claim 9,
  wherein the relay device transmits the specific information frame, based on the priority level added to the specific information frame.

11. A state estimation method executed by a first computer, comprising:
  by the first computer,
  functioning as a learned model generated such as to receive a measurement value of a first state variable as input and to output an estimate value of a second state variable with respect to an object of a predetermined type, by performing machine learning using, for teaching data, sample data on the first state variable and the second state variable of the object;
  measuring the first state variable of a monitored object that is an object of the predetermined type;
  repeating a second state variable estimation process at each predetermined estimation timing, the second state variable estimation process of inputting a measurement value of the first state variable into the learned model and acquiring output from the learned model as an estimate value of the second state variable of the monitored object; and
  outputting estimation accuracy decline information when a predetermined estimate value sudden change determination condition is met with respect to a first estimate value of the second state variable acquired through the second state variable estimation process in response to input of a first measurement value of the first state variable, or when the first measurement value is out of a supposed range of inputs according to the teaching data.

12. A learned model generation method executed by a second computer for the learned model implemented on the first computer that executes the state estimation method according to claim 11, wherein the estimation accuracy decline information includes the first measurement value, the learned model generation method comprising:
  by the second computer,
  generating a new version of the learned model for the object of the predetermined type, by performing additional machine learning using, for teaching data, sample data on the first state variable and second state variable of the object; and
  performing additional learning for the learned model, based on the first measurement value.

13. A non-transitory recording medium storing a state estimation program that causes a computer to execute:
- a process of functioning as a learned model generated such as to receive a measurement value of a first state variable as input and to output an estimate value of a second state variable with respect to an object of a predetermined type, by performing machine learning using, for teaching data, sample data on the first state variable and the second state variable of the object;
- a process of measuring the first state variable of a monitored object that is an object of the predetermined type;
- a process of repeating a second state variable estimation process at each predetermined estimation timing, the second state variable estimation process of inputting a measurement value of the first state variable into the learned model and acquiring output from the learned model as an estimate value of the second state variable of the monitored object; and
- a process of outputting estimation accuracy decline information when a predetermined estimate value sudden change determination condition is met with respect to a first estimate value of the second state variable acquired through the second state variable estimation process in response to input of a first measurement value of the first state variable, or when the first measurement value is out of a supposed range of inputs according to the teaching data.

* * * * *